United States Patent [19]
Perkins et al.

[11] Patent Number: 6,116,000
[45] Date of Patent: Sep. 12, 2000

[54] METHOD OF AND APPARATUS FOR MANUFACTURING AIR-FILLED SHEET PLASTIC AND THE LIKE

[75] Inventors: Andrew Perkins, Berkeley; Nicholas De Luca, San Francisco, both of Calif.

[73] Assignee: Novus Packaging Corporation, San Francisco, Calif.

[21] Appl. No.: 09/207,129

[22] Filed: Dec. 8, 1998

[51] Int. Cl.⁷ .................................................. B65B 23/00
[52] U.S. Cl. ........................... 53/472; 53/449; 53/139.5; 53/238
[58] Field of Search .......................... 53/403, 472, 139.5, 53/449, 474, 238, 155

[56] References Cited

U.S. PATENT DOCUMENTS

| | | | |
|---|---|---|---|
| 4,793,123 | 12/1988 | Pharo | 53/472 |
| 5,272,856 | 12/1993 | Pharo | 53/472 |
| 5,552,003 | 9/1996 | Hoover et al. | 53/472 |
| 5,651,237 | 7/1997 | De Luca | 53/472 |

*Primary Examiner*—Linda Johnson
*Attorney, Agent, or Firm*—Rines and Rines

[57] ABSTRACT

An improved method of and apparatus for manufacturing thin plastic sheet air-inflated shipping or storage cushions or pillows for delicate articles and the like involving the use of novel retractable air-injection straws and plastic blank supporting and sealing techniques.

9 Claims, 6 Drawing Sheets

METHOD OF AND APPARATUS FOR MANUFACTURING AIR-FILLED SHEET PLASTIC AND THE LIKE

The present invention relates to air-filled sheet plastic cushions or pillows or the like for the shipping and storage of delicate articles, being more particularly concerned with structures, apparatus and techniques of the type disclosed in earlier U.S. Pat. Nos. 5,454,642, 5,651,237, and 5,755,328 of the common assignee herewith, (systems employing a thin-film plastic substrate in conjunction with machinery to automate or semi-automate the packaging of items within cushions of air formed and bounded by such substrates), and to improvements thereon.

BACKGROUND OF INVENTION

The advantages of air-filled thin plastic envelopes, cushions, and pillows or the lie for shipping, storing and otherwise protecting delicate articles placed therewithin, are explained in said prior patents and are now coming to be more appreciated for their improved efficacy, simplicity, lower cost, environmentally more desirable properties, and, where desired, re-visibility features, largely absent in the myriad of today's shipping materials and techniques.

The plastic sheet blanks for sealing and air-filling that are described in said patents comprise a pair of adjacent upper and lower flat plastic sheets ultimately forming the cushioning pillows when air inflated and peripherally sealed. They are constructed with parallel tilling inlet paths on each side of a central axis about which the pillows are folded with the article-to-be-protected inserted therebetween prior to inflation.

While the construction and manufacturing techniques disclosed in said patents have been found to work well in practice, higher speed commercial production and greater flexibility needs have given rise to the need for the improved techniques of the present invention. The operation of the machinery described in above-mentioned U.S. Pat. No. 5,651,237, involves first advancing the plastic substrate, such as that described in said U.S. Pat. No. 5,454,642, to a loading position, then placing an object-to-be-packaged on the film at the machine platform location, further holding the film over the object, heat-sealing the film around the object, inflating the air chambers of the package, and then removing the completed package from the machinery. Among these is the desirability for greater and even independent control (where desired) of the air injection into the above-discussed separate inlet paths, and other manufacturing refinements.

OBJECTS OF INVENTION

A principal object of the present invention, accordingly, is to provide a new and improved manufacturing method, of apparatus and resulting product of this character that affords such greater and even independent control (where desired) of the air inflation of the cushioning pillows, as well as simplification and other improvements in the techniques and construction of said earlier patents and of other type of plastic envelopes such as these of other prior patents described and referenced in said earlier patents, including providing greater control in the accurately advancing of the film, in the inserting of inflation tubes into the film, in supporting objects prior to inflating, in insuring proper inflation levels, in the heat sealing of the film, and in further allowing for the reuse of the packages once they have been shipped and opened. The improvement of the present invention address and admirably provide a solution to all of these problems.

Other and further objects will be explained hereinafter and are more particularly delineated in the appended claims.

SUMMARY

In summary, however, from one of its important aspects, the invention embraces a method of air filling a pair of adjacent upper and lower flat plastic sheets forming cushioning pillows for the safe shipping of articles when air inflated and peripherally sealed, and having respective parallel filling inlet paths on each side of a central axis, that comprises, providing an aperture in the lower sheet at each inlet path; positioning a pair of compressed air inlet straws below the lower sheet for later insertion at an acute angle into the corresponding apertures in the respective inlet paths and under the upper surface sheet; applying a flattening surface to the sheets over the region of the apertures; inserting the straws through the apertures at said acute angle into the respective inlet paths and under the flattening surface; withdrawing the flattening surface and folding the sheets together about said central axis as a vertex line with an article-to-be-protected inserted therebetween; sealing the peripheries of the upper and lower sheets; and thereupon injecting compressed air into the straws to inflate the sheets into upper and lower air-filled pillows cushioning the article therebetween; upon completion of the filling, terminating the air injection, sealing the inlet paths, retracting the straws therebelow, and releasing the folded pillows as a unit.

The invention employs the plastic surface material used as described in said U.S. Pat. No. 5,454,642, modified for better integration of the film within the automatic machinery, by backing up the single common air input, closer to the air supply, and splitting the same into a pair of adjacent inflation input tubes or straws. The plastic blanks for the packages arc manufactured end-to-end, separated by perforations.

Preferred and best mode designs and constructions are later fully described.

DRAWINGS

The invention will now be described in connection with the accompanying drawings in which.

PREFERRED EMBODIMENT OF THE INVENTION

Figure 1:
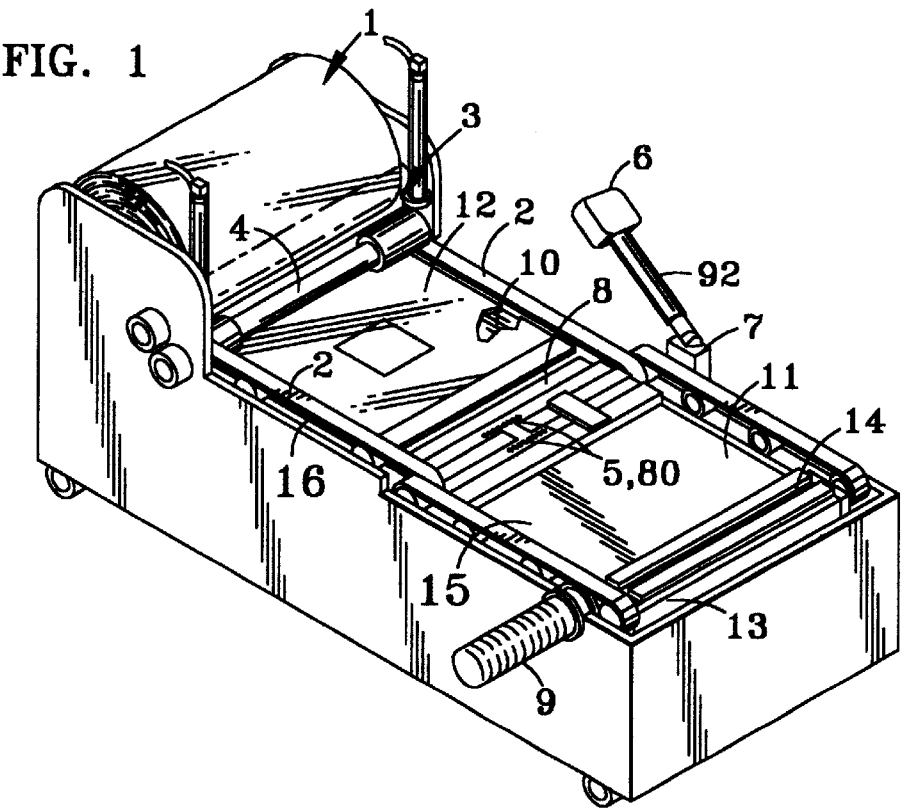
FIG. 1 is an isometric view showing the automatic machinery as a bag is advanced.

FIG. 1 illustrates the improved automatic machine 30 of the invention. A roll 1 of successive flat bags of deflated upper and lower plastic layers 102 and 103 (shown heat sealed in FIG. 10 at 110) are placed on idler rollers 3 and advanced using drive roller 4 and a pair of longitudinally moving belts 2. It is important that belts 2 travel at a higher velocity than drive roller 4 in order to insure that extra slack in the advanced or infused bag, such as the first bag 12 off the roll, be taken-up. As bag 12 moves forward it passes over a plate 10 which is tilted to insure that the bag will pass over protrusions in heat seal area 8 and later-described inflation straw holes 5.

Figure 10:
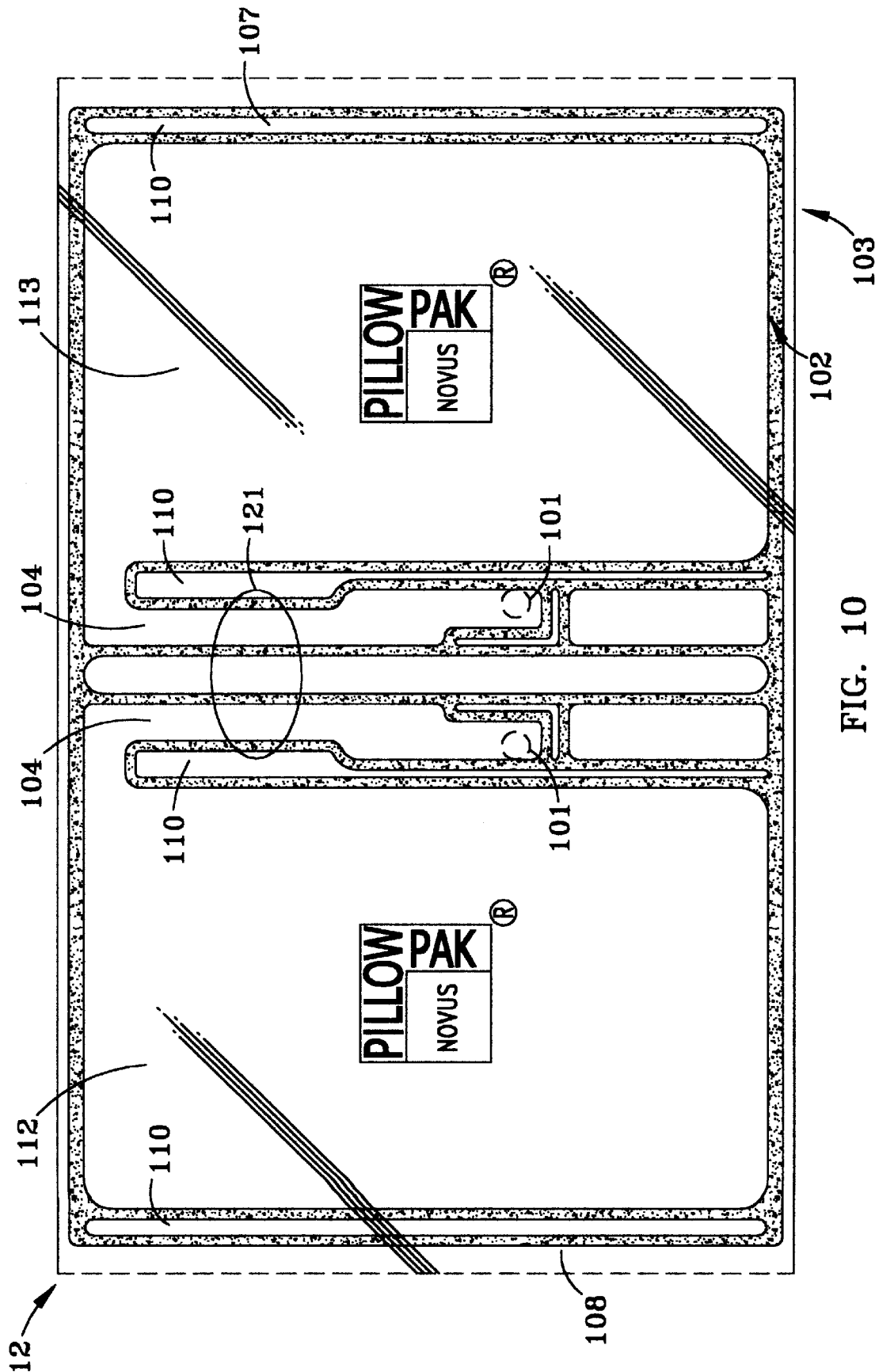
FIG. 10 is a two dimensional view of the peripheral seals for use in the automatic machinery in accordance with the present invention.

The plastic film bag structure is shown in FIG. 10 formed of upper and lower flat plastic sheets 102, 103, forming a pair of centrally axially joined cushioning pillows or chambers 112, 113, when air inflated and peripherally sealed at 110, and having parallel air inlet paths or channels 104 on each side of the central axis at the joining of the left- and right-hand portions 112, 113, provided with air inlet apertures 101 on each side in the respective lower film sheets for receiving compressed air from respective inflation straws 80.

Figure 2:
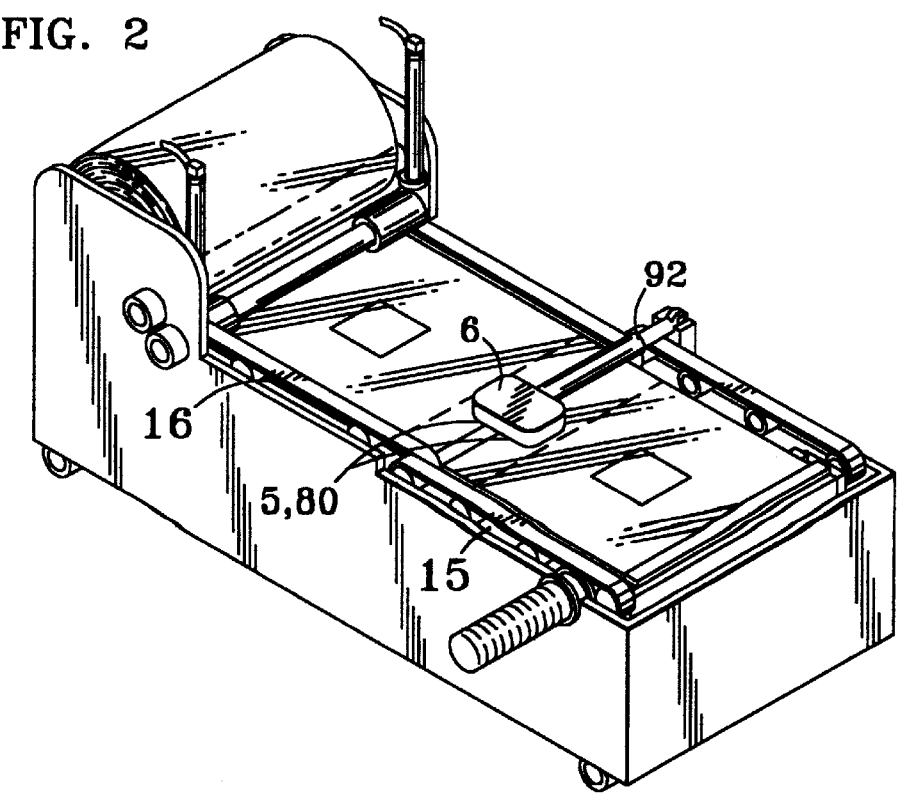
FIG. 2 is an isometric view illustrating the automatic machinery as the bag in FIG. 1 is stopped and the insertion plate lowers onto the bag.

As shown in FIG. 2, when the bag reaches the far end 13 of machine 30, an exterior sensor 14 detects the bag and stops the driver roller 4 and belts 2, thus stopping the film. A transversely centrally foldable frame carrying the surfaces 15 and 16, receiving the bag, then locks and holds down the bag. As soon as the bag 12 has stopped the insertion plate 6 carried by the arm 92 moves in from the far side of the machine, pivots inwardly about pivot 7, and covers over the central region of the bag 12 between the left and right halves of the bag film. Subsequently, a pair of insertion straws 80, shown in FIG. 8 at an air-filling station move in an acute angular direction extending out of holes 5 and inserting into the pair of film bag inflating inlet apertures 101 in the adjacent parallel filling inlet paths 104, and traveling between layers 102 and 103 of bag 12, inside the inflation paths or channels 104 (FIG. 10). The insertion plate 6, as show in FIG. 9, has grooves 91 in the smooth surface material 90, into which the straws 80 are directed and guided. These grooves help to insure proper insertion of the straws 80 by enabling separating layers 102 and 103 of bag 12 under the flattening action of the plate 6.

Figure 8:
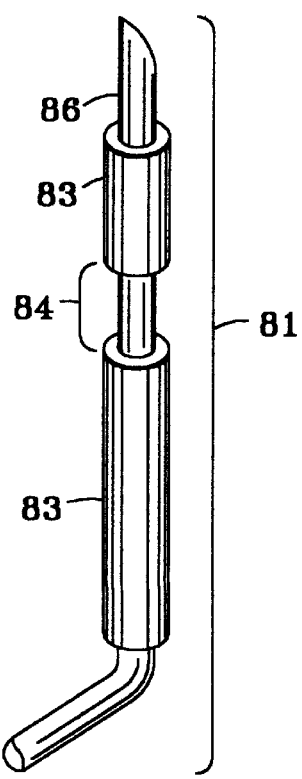
FIG. 8 is an isometric view of the inflation straws.
Figure 9:
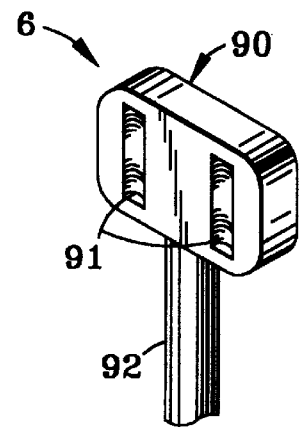
FIG. 9 is an isometric view of the insertion plate and the guide channels in the plate.

The straws 80, as shown in FIG. 8, are preferably made with soft tubing material 81, but stiff at the tips 86 as by being cut at an angle to facilitate the insertion process. The straw also is provided with external metal sleeves 83 to allow flexing at area 84, while strengthening the straw along its length.

In summary, thus, with the plastic roll 1 of such units placed onto the rollers 3 of the machine, the first film bag 12 is placed under the driver roller 4 and, after activation of the drive roller, is guided by the pair of belts 2 that pull the film longitudinally to a stop point. The film is also guided by tiltable plates 10 located below the film, with each plate helping, as before stated, to lift the film above protrusions of the machine surface. The belts and drive roller stop the film at the impulse generated by the exterior sensing element 14, activated by the end of the advancing film. The film is then locked down in the stopped flat position, by the frame 15, 16, with the pair of inflation slots 5 facing downwards against the top surface of the machine and located in close proximity to the inflation tube or straw ends at the air-filling station or region. Since the inflation straws 80 are located below the surface of the machine, the bag film can pass freely above them during the prior indexing stage. For inflation, it becomes necessary to push these inflation straws forward into the slots. This may be accomplished using pneumatics or electro-mechanical components. Prior to pushing these straws 80 outward, however, the insertion plate 6 is brought down onto the surface of the central portion of the film bag carrying the air inlet slots, to hold the film flat against the machine surface. Channels 91 in the plate 6 (FIG. 9) extend linearly in the direction of the inflation straw extension and are located above the insertion points. Such channels 91 are formed smoothly without any aberrations that might catch during the insertion process. When the plate 6 has stopped in position over the central axis and inlet filling aperture regions of the adjacent film bag halves, the extension tubes are automatically then activated and inserted into the inlet filling apertures 101 of the plastic film bag (FIG. 10).

The inflation straws, as before stated, are made using a soft material such as polyethylene or "Teflon", and are cut at an angle at the tip to facilitate insertion. It is critical that the straws be soft enough not to puncture or tear the plastic bag film, and yet stiff enough to push the upper film layer 102 (the lower film layer 103 having the inlet apertures 101 in it) into the grooves of the top plate, and further not bend or crimp in the process. Improvements to these straws include the before-described metal sleeve shrouds or jackets 83 at one or more points along the length of the straw in order to provide strength, yet allow for bending and insertion.

Figure 3:
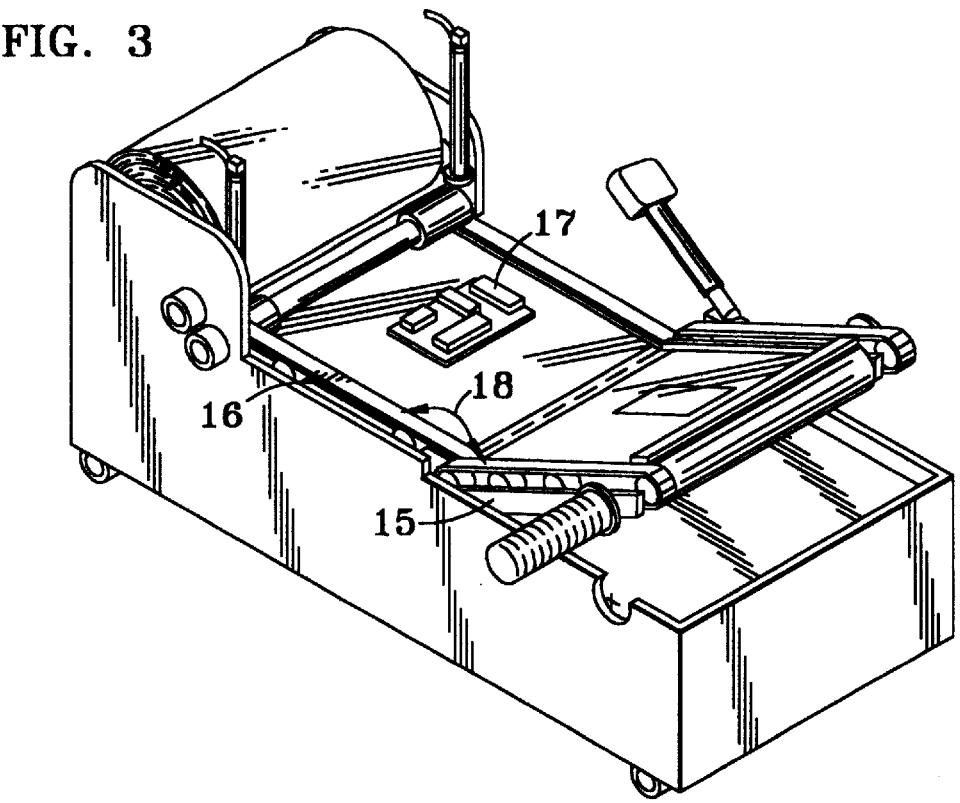
FIG. 3 is an isometric view illustrating an item to be packaged placed on the bag in FIG. 1 with the bag partially folded over the item.

In FIG. 3, the right-hand half 15 of the machine is shown pivotally folding the right-hand part of the film bag 12 over the object or product 17 carried on the left-hand part of the film, using the handle 9, FIG. 1. In some cases, an electro-mechanical system may be used to push handle 9 to achieve the folding process. Insertion plate 6 is lifted out or withdrawn to the side from the angular region 18 at pivot 7 in FIG. 1, by laterally withdrawing the extension arm 92, FIG. 9. Extension arm 92 may also serve for creating a crease in the bag 12, thus facilitating the folding process.

Recapitulating this operation, once the film has stopped and the foldable frame carrying surfaces 15 and 16 has locked, and the insertion process is underway, the object, article, product or item-to-be-packaged is placed on the left-hand half of the bag resting on the left-hand tiltable machine plate 16, FIG. 3. The right-hand half of the bag film is subsequently folded over the object via the pivotable frame portion carrying hollowed-out backing plate 15, FIG. 3, bringing halves of the plastic bag together around the object, and about the central axis vertex. During the start of the process of the folding, the supporting arm 92 of the grooved plate 6 which was used to help in flattening during insertion process, is withdrawn to the side (rearward in FIG. 3) from between the two folded bag surfaces via a mechanical or pneumatic actuator, not shown.

Figure 4:
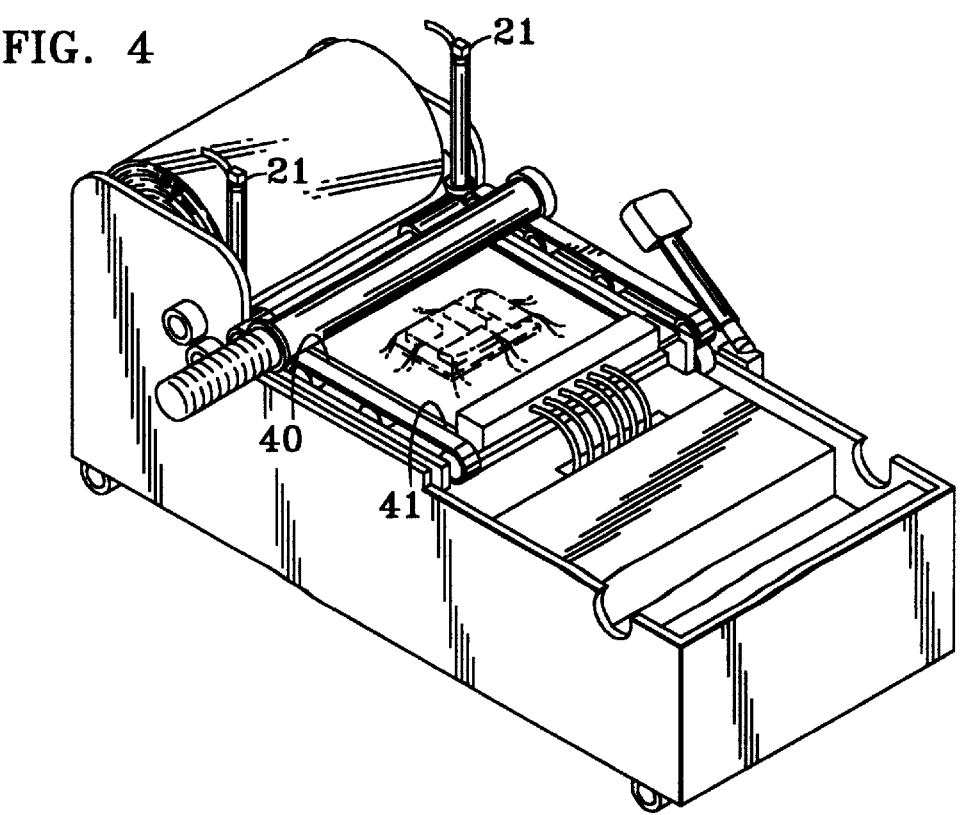
FIG. 4 is an isometric view illustrating the bag of FIG. 1 with the bag completely folded over the item to be packaged.

When the two surfaces of the bag have been totally folded together, and about the article or product, FIG. 4, the hollowed-out backing plate 15 is locked in place via a pneumatic or mechanical hold-down. A timing sequence then begins which actuates the external-heat-sealing bar process, the inflating process, and the channel closing heat-seal process. Two heat seals are place perpendicularly to the length of the bag; the first joining the two bag ends, and the second forming a partial seal between the inflation channel and the inflated halves of the bag. It should be noted that both seals are located at a "dead" area in the bag which is not inflated but does need to hold air. This is especially important in the case of using impulse heat seals which tend to burn through plastic materials at the ends. The first seal is also designed to allow the package, once inflated and used, to be opened or peeled apart at the "dead area", thus insuring that the air does not leak so that the package can be reused. Bags filled with liquids or requiring hermetic sealing can be simultaneously sealed shut within the package by placing the open end of the bag over the second heat seal. Additional heat seals, located in the same direction of the film length, may also be used in insure a complete hermetic seal around the product.

In the case in which it is preferable to use the package for taking space in boxes called "void fill", rather than cushioning, maximizing the amount of air in the package is important. To do this, the heat seals should be shut-of via an electric switch.

FIG. 4 illustrates this completed folded process with the half 15 folded completely over the half 16 about tile central axis as a vertex line, and held firmly in place with pneumatic hold-downs 21. In a more manual system, these hold downs 21 may be powered by hand force. The result of this folding process is the wrapping of bag 12 around product 17. Bag 12, as shown in FIG. 10, has one air chamber 112 under the product, and an air chamber 113 on top of the product with ends 108 and 107 overlapping. Heat seals by heating bars at 40 and 41 are subsequently activated in areas 110 which seals overlapping areas in bag 12; areas 112 separated from the air chambers 112 and 113.

Once the seals have been made, thus closing the package around the article, product or item, compressed air or other filler is injected into the bags to form the pillow cushions, via the insertion straws. The inflation process proceeds until the bags have reached their correct filling pressure, FIGS. 5 and 6. As the bags are filled, it sometimes becomes necessary to adjust the relative pressure of each straw independently; for example, via a valve, so as to insure proper filling levels of each chamber. As the expansion continues, the end perforations between the bags automatically break, thus separating the inflated bag from the rest of the deflated ones in the roll. In addition, the tiltable platform on which the product was resting, bends downward to allow for the extra volume of the inflated package. An external sensing element detects the proper inflation level, at which point the inflation stops and simultaneously a heat-sealing element fuses the air channels shut.

Figure 5:
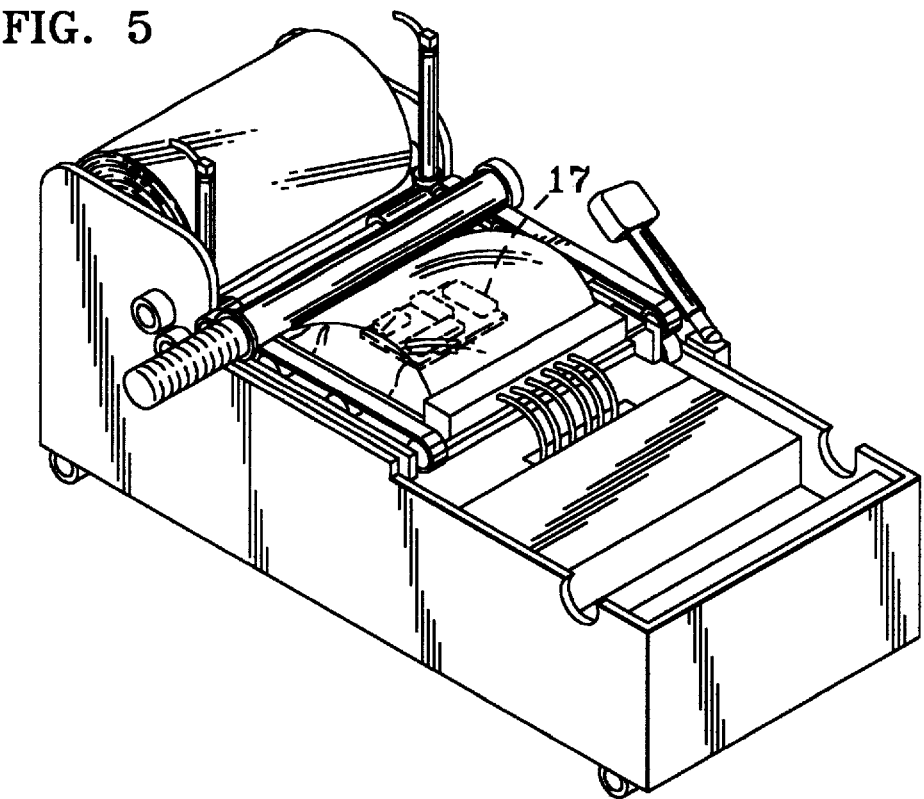
FIG. 5 is an isometric view illustrating the bag of FIG. 1 in the process of being heat sealed shut and inflated.
Figure 7:
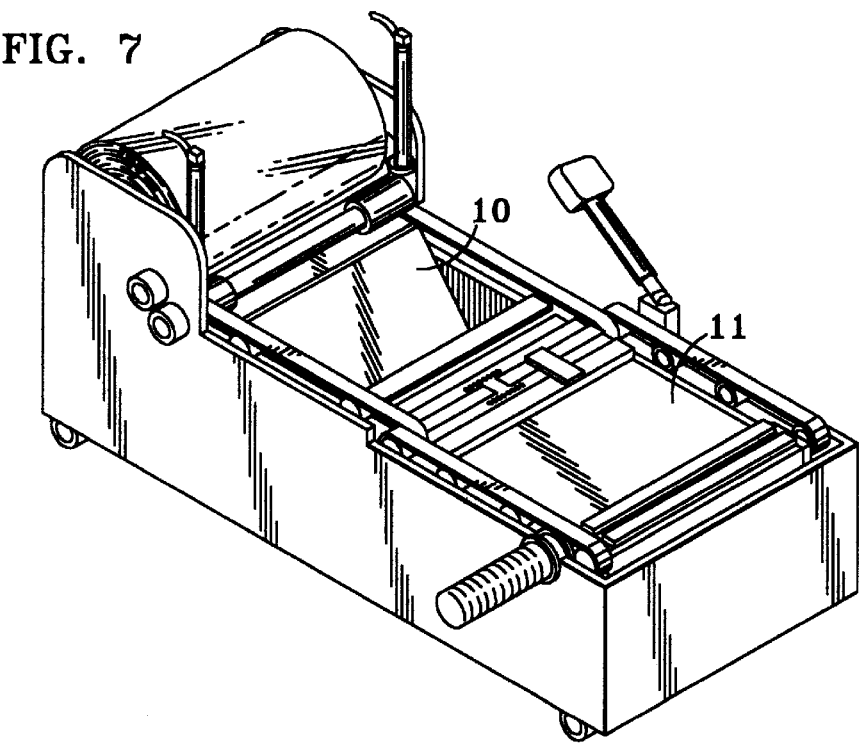
FIG. 7 is an isometric view of the automatic machinery illustrating the tiltable support plate.

This is shown in FIG. 5, with the bag 12 in the process of inflating bag halves 112 and 113 by injecting compressed air through the straws 80 into the apertures 110 in the adjacent inlet paths 104, expanding the halves 112 and 113 into upper and lower inflated cushion pillows connected along the central axis as a vertex. During the inflation, plate 10 bends downward as shown in FIG. 7 to allow for the added volume of the air. When the proper level of air inflation has been achieved, an exterior sensor (not shown) activates a final heat seal element which heat-seals channels 104 shut in overlapping regions 121 of bag 12, FIG. 10.

Figure 6:
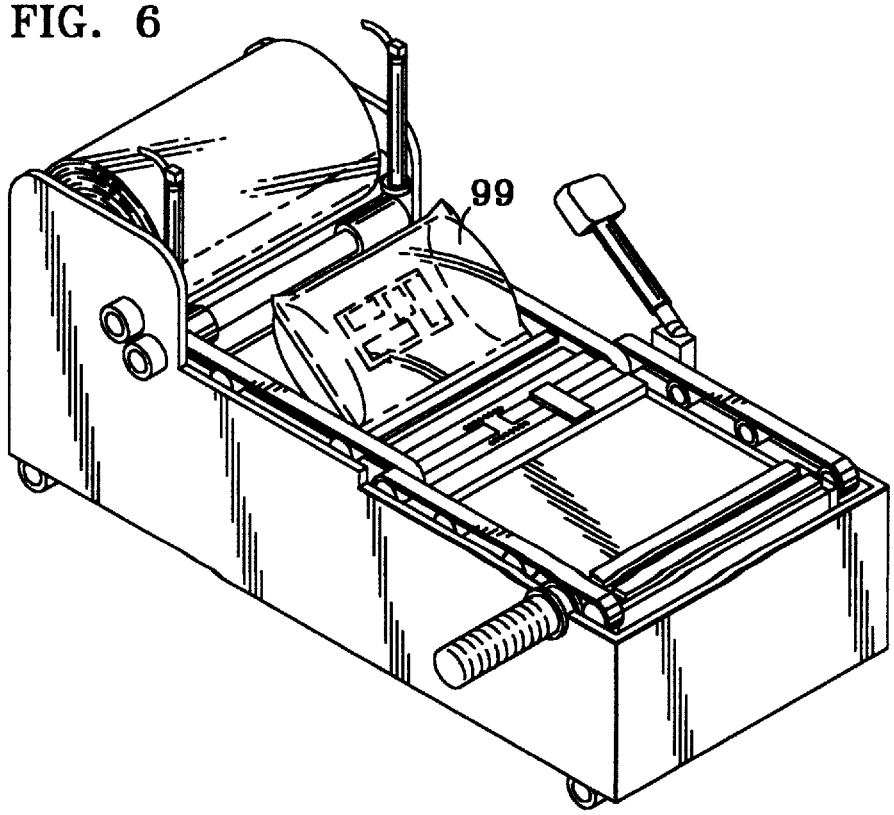
FIG. 6 is an isometric view illustrating the bag of FIG. 1 when it has been completely transformed into the protective package for the item to be packaged.

As more particularly shown in FIG. 6, after a preset delay that allows for cooling of the sealed material, holds down 21 disengage, and the half 15 is returned to end 13. The completed package 99 can now be removed and place in a box for shipment.

Although a fully automatic machine facilitates the indexing of the film and the insertion of the inflation straws into the film, the high expense of these electromechanical and pneumatic components, in some cases, makes it preferable to manually place the film and manually push the straws into the holes. A simplified version of the automatic machine would avoid use of belting and drive systems.

Figure 11:
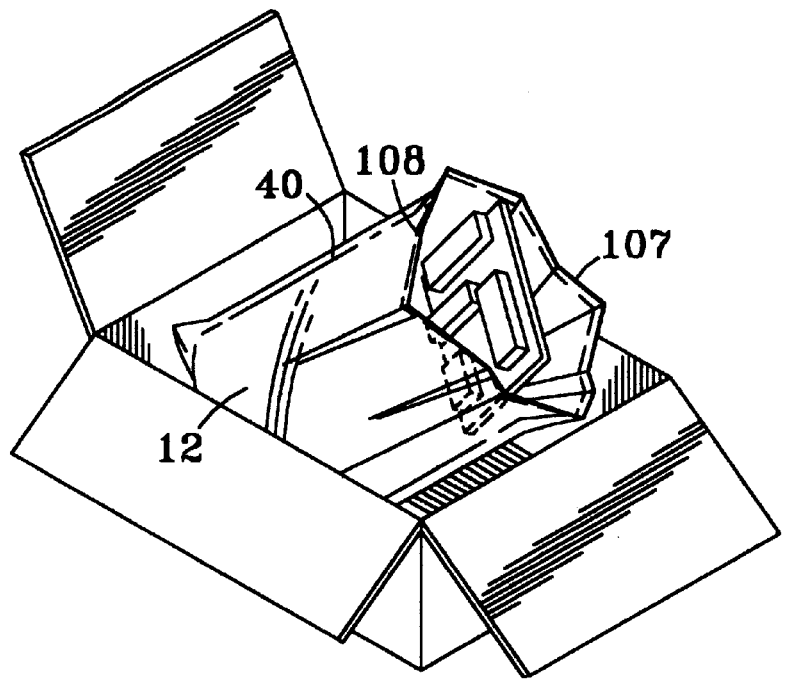
FIG. 11 is an isometric view illustrating the opening of the bag to receive the shipped package.

FIG. 11 shows how a package 99 can be disassembled by separating ends 108 and 107 of bag 12 at the heat seal 40, thus allowing product 17 to be removed from the package without causing deflation of the air pillow chambers 112 and 113. Thus, the package can be reused by applying tape between ends 108 and 107 of bag 12 and simulating the heat seal 40.

Figure 12:
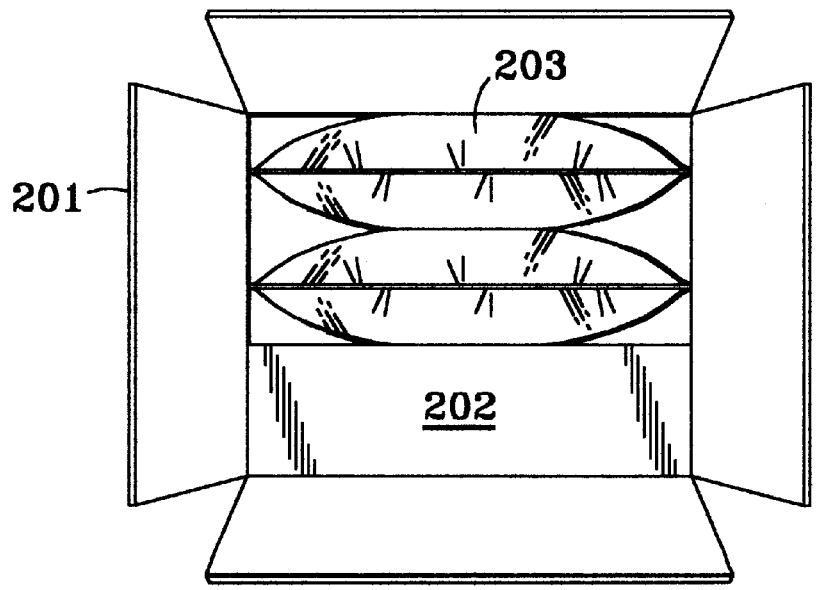
FIG. 12 is an isometric view illustrating use of the inflated bag for void fill packaging applications.

In the modification of FIG. 12, an inflated bag 12 is shown used as a space-taking package 203 in a box 201 containing an internal box 202. Unlike package 99, package 203 has no heat seal 40 holding ends 107 and 108 of bag 12. Seal 40 has been intentionally shut off via an electronic switch, thus creating two separated inflated halves 112 and 113. As these halves are not bonded together at their ends 107 and 108, the halves 112 and 113 are not restricted against each other and can thus inflate more fully than they do in package 99.

Further modifications will occur to those skilled in this art and such are considered to fall within the spirit and scope of the invention as defined in the appended claims.

What is claimed is:

1. A method of air filling a pair of adjacent upper and lower flat plastic sheets forming adjacent cushioning pillows for the safe shipping of articles when air-inflated and peripherally sealed and having respective parallel air-filling inlet paths on each side of a central axis, that comprises, providing an aperture in the lower sheet at each inlet path; positioning a pair of compressed air inlet straws below the lower sheet for later insertion at an acute angle into the corresponding apertures in the respective inlet paths and under the upper sheet; applying a flattening surface to the sheets over the region of the apertures; inserting the straws through the apertures at said acute angle into the respective inlet paths and under the flattening surface; withdrawing the flattening surface and folding the sheets together about said central axis as a vertex with an article-to-be-protected inserted therebetween; sealing the peripheries of the upper and lower sheets; and thereupon injecting compressed air into the straws to inflate the sheets into upper and lower air-filled pillows cushioning the article therebetween; upon completion of the filling, terminating the air injection, sealing the inlet paths, retracting the straws therebelow, and releasing the folded pillows as a unit, and wherein the straws are flexible but are provided with stiff ends to enable insertion into the apertures under the flattening surface and the flattening surface is provided with channels under which the stiff ends of the straws are guided during insertion under the upper sheets.

2. The method of claim 1 wherein the pressure or quantity of air injected into each of the pair of straws is relatively and independently varied to provide different filling for each pillow.

3. The method of claim 1 wherein the upper and lower sheets are successively fed from a roll along a flat surface to an air-filling position under a foldable frame, the locking of which holds the sheets flat and causes the application of the flattening surface.

4. The method of claim 3 wherein the folding of the frame effects said folding of the sheets about said central vertex axis and initiates the peripheral sealing.

5. The method of claim 4 wherein the unfolding of the frame enables tearing of the inflated cushion unit from the filling position.

6. An apparatus for air-filling a pair of adjacent upper and lower flat plastic sheets forming cushioning pillows for the safe shipping of articles when inflated and peripherally sealed and respective parallel filling inlet paths on each side of a central axis and each provided with an aperture in the lower sheet, said apparatus having, in combination, a flat filling table upon which the sheets are fed from a roll of sheets positioned at one end thereof; a centrally foldable frame for locking about the periphery of the sheets when positioned upon the table; a pair of compressed air inlet straws positioned below the table and the lower sheet thereon for later insertion at an acute angle into the corresponding apertures in the respective inlet paths under the upper sheet; a flattening surface positioned to the side of the table and provided with an arm for pivotally applying the surface over the region of the apertures upon locking of the frame; means for inserting the straws through the apertures at said acute angle into the respective inlet paths and under the flattening surface; means for actuating said arm to withdraw the flattening surface and controlling folding the frame to fold the sheets together about said central axis as a vertex, as an article-to-be-shipped is inserted therebetween; heat-sealing bars actuable to seal the peripheries of the upper and lower sheets within the frame; means thereupon operable to inject compressed air through the straws to inflate the sheets into upper and lower air-filled pillows for cushioning an article inserted therebetween during the folding; means for sensing the completion of the filling and means responsive thereto for thereupon terminating the air injection, sealing the inlet paths, and retracting the straws below the table; and means for opening the folded frame to release the folded pillows as a unit, and wherein the straws are flexible but are provided with stiff ends to enable insertion into the apertures under the flattening surface and the flattening surface is provided with channels under which the stiff ends of the straws are guided during inserting under the upper sheets.

7. The apparatus as claimed in claim 6 wherein the straws comprise plastic tubing terminally stiffened by metal sleeves.

8. Apparatus as claimed in claim 6 wherein the unfolding of the frame enables tearing of the inflated cushion unit from the frame.

9. Apparatus as claimed in claim 6 wherein means is provided for relatively and independently varying the air pressure or quantity injected into each pillow.

* * * * *